United States Patent
Mallick et al.

(10) Patent No.: US 10,327,264 B2
(45) Date of Patent: Jun. 18, 2019

(54) DETERMINING A REQUEST FOR SYSTEM INFORMATION

(71) Applicant: Motorola Mobility LLC, Chicago, IL (US)

(72) Inventors: Prateek Basu Mallick, Langen (DE); Joachim Loehr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/464,078

(22) Filed: Mar. 20, 2017

(65) Prior Publication Data

US 2018/0270865 A1   Sep. 20, 2018

(51) Int. Cl.
| | |
|---|---|
| *H04W 4/00* | (2018.01) |
| *H04W 74/08* | (2009.01) |
| *H04W 72/12* | (2009.01) |
| *H04W 48/14* | (2009.01) |
| *H04W 72/00* | (2009.01) |

(52) U.S. Cl.
CPC ....... *H04W 74/0833* (2013.01); *H04W 48/14* (2013.01); *H04W 72/12* (2013.01); *H04W 72/005* (2013.01)

(58) Field of Classification Search
CPC .......................... H04W 74/0833; H04W 72/12
See application file for complete search history.

(56) References Cited

U.S. PATENT DOCUMENTS

| | | | | |
|---|---|---|---|---|
| 2009/0209248 A1* | 8/2009 | Lee | ..................... | H04W 74/002 455/422.1 |
| 2015/0350959 A1* | 12/2015 | Yang | ................. | H04W 36/0016 370/331 |
| 2017/0251500 A1* | 8/2017 | Agiwal | ................... | H04W 4/06 |

OTHER PUBLICATIONS

Fujitsu, "Considerations about on-demand SI acquiring procedure", 3GPP TSG-RAN WG2 Meeting #97 R2-1701397, Feb. 13-17, 2017, pp. 1-4.
Blackberry UK Ltd, "Handling of SI request from unauthenticated UEs in NR", 3GPP TSG RAN2 NR Ad Hoc R2-1700375, Jan. 17-19, 2017, pp. 1-4.
Huawei, Hisilicon, "Indications for On-Demand System Informations", 3GPP TSG-RAN WG2 #97 R2-1701210, Feb. 13-17, 2017, pp. 1-4.
Media Tek Inc., "NR SI Unicast", 3GPP TSG-RAN#97 Meeting R2-1701362, Feb. 13-17, 2017, pp. 1-6.
Ericsson, "NR System information distribution—principles and example", 3GPP TSG-RAN WG2 #95bis Tdoc R2-166773, Oct. 10-14, 2016, pp. 1-6.
Ericsson, "On demand SI", 3GPP TSG-RAN WG2 #97 TdocR2-1700832, Feb. 13-17, 2017, pp. 1-6.
Interdigital Communications, "Request and Acquisition of other-SI", 3GPP TSG-RAN WG2 Meeting #97 R2-1701195, Feb. 13-17, 2017, pp. 1-4.

(Continued)

*Primary Examiner* — Minh Trang T Nguyen
(74) *Attorney, Agent, or Firm* — Kunzler Bean & Adamson

(57) ABSTRACT

Apparatuses, methods, and systems are disclosed for determining a request for system information. One apparatus includes a processor that: determines whether system information used by the apparatus is scheduled to be transmitted; and in response to the system information not being scheduled to be transmitted, determines whether the system information is requested by a second apparatus.

28 Claims, 7 Drawing Sheets

(56) References Cited

OTHER PUBLICATIONS

Samsung, "System Information Signalling Design in NR", 3GPP TSG-RAN WG2 Meeting #95 R2-164693, Aug. 22-26, 2016, pp. 1-6.

Samsung, "System Information Signalling Design in NR", 3GPP TSG-RAN WG2 Meeting #94 R2-163371, May 23-27, 2016, pp. 1-8.

PCT/US2018/023378, "Notification of Transmittal of the International Search Report and the Written Opinion of the International Searching Authority, or the Declaration", Patent Cooperation Treaty, dated Jul. 11, 2018, pp. 1-19.

* cited by examiner

DETERMINING A REQUEST FOR SYSTEM INFORMATION

FIELD

The subject matter disclosed herein relates generally to wireless communications and more particularly relates to determining a request for system information.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, some system information may be transmitted and/or received more often than is necessary. In certain configurations, to reduce the signaling load for providing system information, a minimum amount of system information may be used. The minimum system information ("SI") may contain basic information for initial access to the cell (e.g., subframe number, list of public land mobile networks ("PLMNs"), cell camping parameters, RACH parameters) that is broadcast periodically in a cell. In some configurations, the other non-minimum SI doesn't necessarily need to be periodically broadcast (e.g., it may be a network decision). In various configurations, the other SI may be provided on-demand to UEs (e.g., a UE may request it). Delivery of other SI may be done in a broadcast or unicast manner. In some configurations, the minimum SI may indicate whether a specific SIB is periodically broadcasted or provided on-demand. To obtain the one or more SIBs which are not periodically broadcasted and are provided on-demand, a UE may initiate an on-demand SI acquisition procedure (e.g., SI request). For an SI used by the UE, the UE may determine whether it is available in the cell and whether it is broadcast or not before it sends a request for it. The scheduling information for other SI may be provided by the minimum SI (e.g., an SIB type, validity information, periodicity, SI-window information, etc.).

In various configurations, multiple UEs may send a request for the same SI. The UEs may use power and resources to send the requests. Moreover, a gNB that receives multiple requests for the same SI may use excessive resources to receive and/or respond to the requests. Furthermore, there may be interference among the multiple requests sent by the UEs.

BRIEF SUMMARY

Apparatuses for determining a request for system information are disclosed. Methods and systems also perform the functions of the apparatus. In one embodiment, the apparatus includes a processor that: determines whether system information used by the apparatus is scheduled to be transmitted; and in response to the system information not being scheduled to be transmitted, determines whether the system information is requested by a second apparatus.

In one embodiment, the apparatus includes a receiver that, in response to the system information being scheduled to be transmitted, receives the system information based on scheduling information for the system information. In a further embodiment, determining whether the system information is requested by the second remote unit includes monitoring messages for an indication that the system information is requested by the second remote unit. In certain embodiments, determining whether the system information is requested by the second remote unit includes checking a common radio network temporary identifier for an indication that the system information is requested by the second remote unit. In various embodiments, the apparatus includes a receiver that, in response to the system information being requested by the second remote unit, receives the system information in response to the system information being transmitted to the second remote unit. In some embodiments, the apparatus includes a transmitter that, in response to the system information not being requested by the second remote unit, transmits a request for the system information.

In certain embodiments, transmitting a request for the system information includes the processor determining whether the first remote unit is authorized to transmit the request prior to transmitting the request. In some embodiments, determining whether the first remote unit is authorized to transmit the request includes checking a parameter. In various embodiments, in response to the parameter passing a predetermined threshold, transmitting the request for system information, and, in response to the parameter not passing the predetermined threshold, not transmitting the request for system information.

In one embodiment, the apparatus includes a receiver that receives a response to the request for the system information. In certain embodiments, the response to the request for the system information is received as part of a random access response having a random access radio network temporary identifier. In some embodiments, the response to the request for the system information includes an indication identifying the system information. In various embodiments, transmitting the request for system information includes the processor determining an order of requests in response to the request including multiple preambles. In certain embodiments, the order of requests includes transmitting a preamble of the multiple preambles first that corresponds to system information scheduled to be transmitted a closest in time, system information more important than other preambles of the multiple preambles, system information for a particular feature, or some combination thereof.

A method for determining a request for system information, in one embodiment, includes determining, at a first remote unit, whether system information used by the first remote unit is scheduled to be transmitted. In various embodiments, the method includes, in response to the system information not being scheduled to be transmitted, determining whether the system information is requested by a second remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
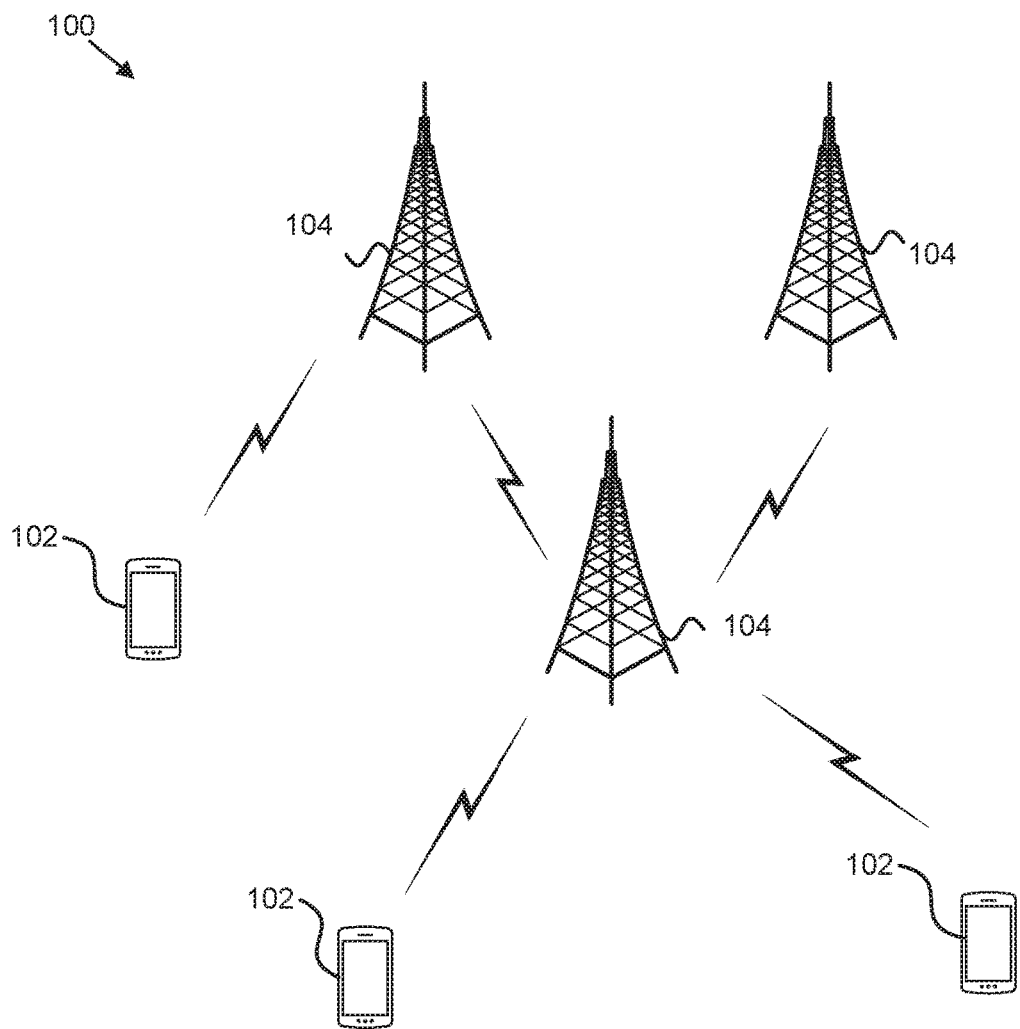
FIG. 1 is a schematic block diagram illustrating one embodiment of a wireless communication system for determining a request for system information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a request for system information. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE protocols standardized in 3GPP, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive information indicating a request for system information from the remote unit 102. In certain embodiments, the base unit 104 may transmit the system information to the remote unit 102.

In another embodiment, a remote unit 102 may determine whether system information used by the remote unit 102 is scheduled to be transmitted. The remote unit 102 may, in response to the system information not being scheduled to be transmitted, determine whether the system information is requested by a second remote unit. Accordingly, a remote unit 102 may be used for determining a request for system information.

Figure 2:
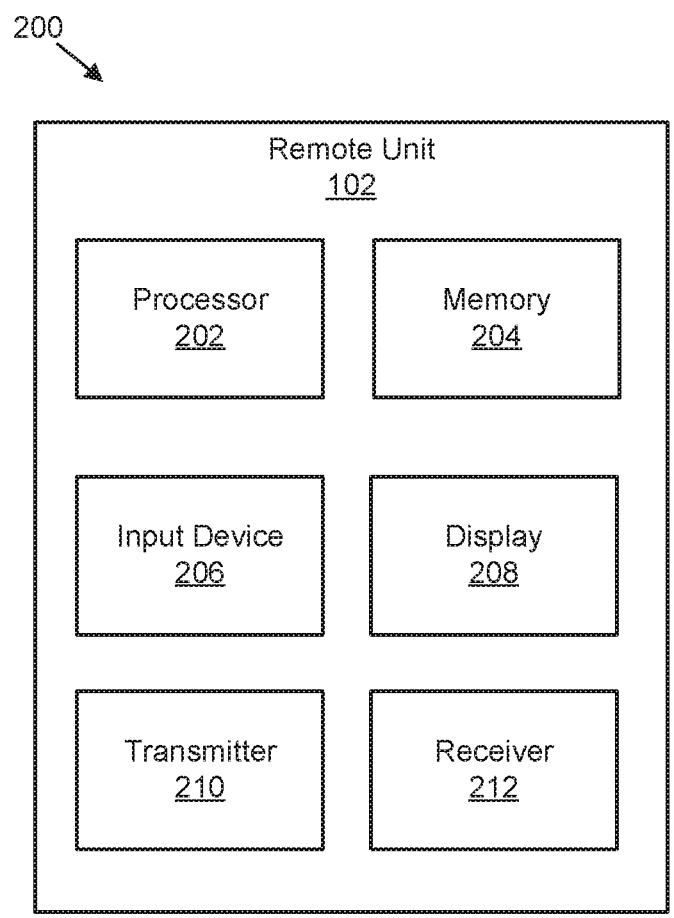
FIG. 2 is a schematic block diagram illustrating one embodiment of an apparatus that may be used for determining a request for system information.

FIG. 2 depicts one embodiment of an apparatus 200 that may be used for determining a request for system information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines whether system information used by the remote unit 102 is scheduled to be transmitted. In certain embodiments, the processor 202 in response to the system information not being scheduled to be transmitted, determines whether the system information is requested by a second apparatus. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system information. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit information indicating a request for system information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
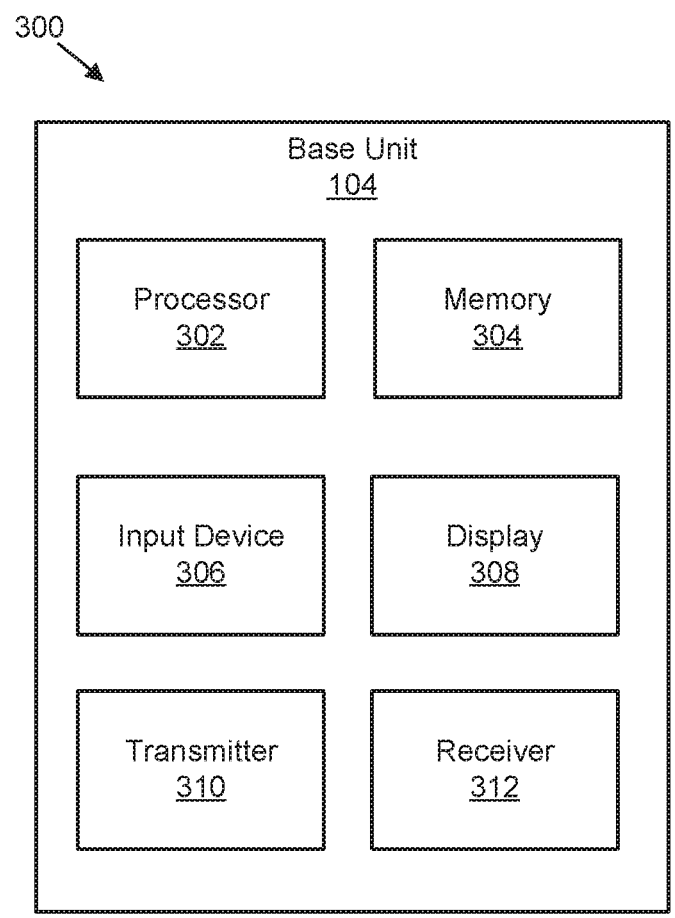
FIG. 3 is a schematic block diagram illustrating one embodiment of an apparatus that may be used for receiving and responding to requests for system information.

FIG. 3 depicts one embodiment of an apparatus 300 that may be used for receiving and responding to requests for system information. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive information from the remote unit 102 indicating a request for system information. In some embodiments, the transmitter 310 may be used to transmit system information to the remote unit 102. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
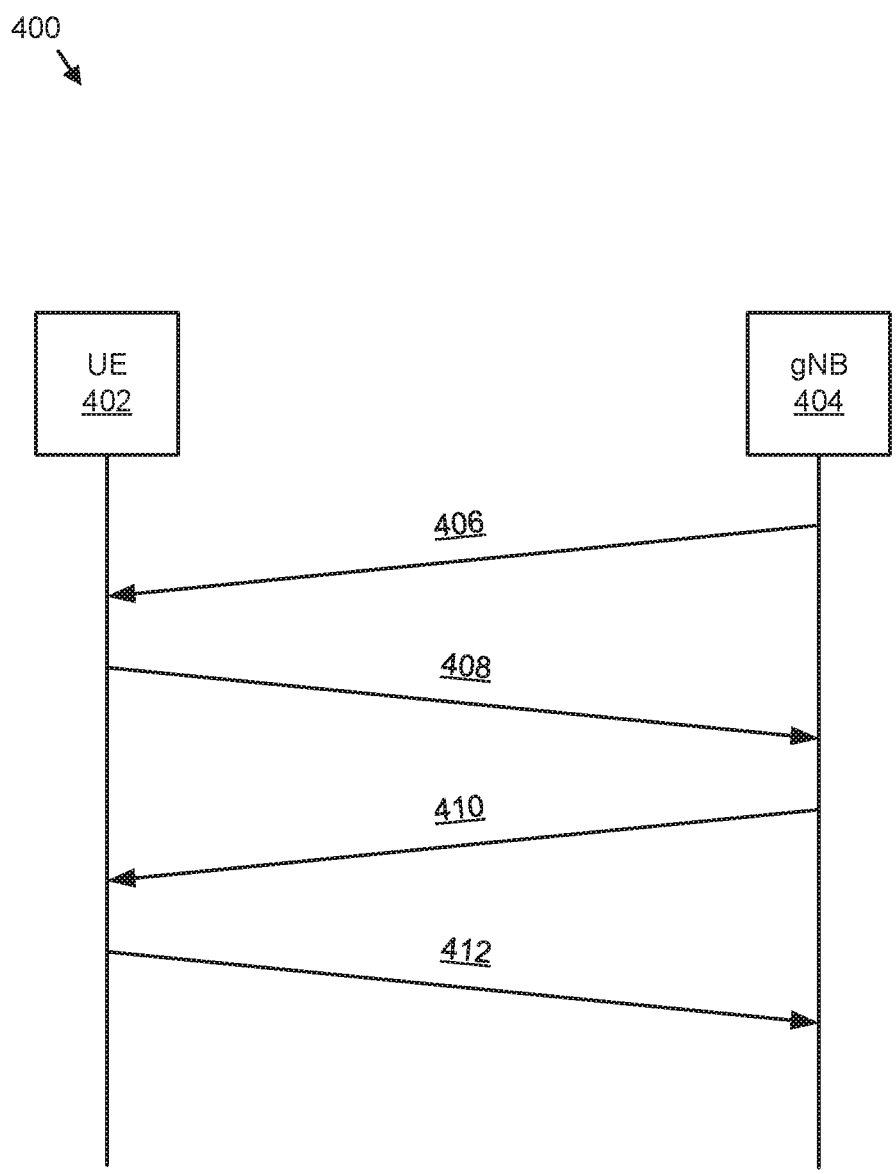
FIG. 4 illustrates one embodiment of communications for transmitting a request for system information.

FIG. 4 illustrates one embodiment of communications 400 for transmitting a request for system information. Specifically, communications 400 between a UE 402 and a gNB 404 are illustrated. The communications 400 may facilitate the UE 402 requesting on-demand SIBs using a RACH message 3 based approach.

In certain embodiments, the gNB 404 may transmit a periodic broadcast 406 to the UE 402. The periodic broadcast 406 may include minimum SI used by the UE 402 for communication. In various embodiments, the UE 402 may transmit a PRACH preamble 408 to the gNB 404. In some embodiments, in response to transmitting the PRACH preamble 408, the gNB 404 may transmit an UL grant in a random access response 410. After receiving the random access response 410, the UE 402 may transmit a system information ("SI") request 412 to the gNB 404 that indicates on-demand SIBs requested by the UE 402. The system information request 412 may be a random access message 3. As may be appreciated, the on-demand SIBs may not be broadcast (e.g., transmitted) unless requested.

In certain embodiments, because message 3 is a UL-SCH transmission (e.g., medium access control ("MAC") protocol data unit ("PDU")) more information may be provided by the UE 402 within the message 3 than in a PRACH preamble. In one embodiment, the UE 402 includes a MAC control element ("CE") within the RACH message 3 to convey the SI request information. In such an embodiment, the MAC CE may contain a bitmap indicating the SI(s)/SIB(s) that the UE 402 wants to acquire. Moreover, the bitmap may have an entry for all on-demand SI(s)/SIB(s) (e.g., all SIBs not broadcast in the cell). Using the bitmap, the UE 402 may indicate (e.g., by setting the corresponding field/bit to a predefined value) which of the SI(s)/SIB(s) it wants to acquire. In certain embodiments, the UE 402 requests system information not only for the current cell, (e.g., cell UE is camped on/connected with) but also for neighboring cells. In one embodiment, the UE 402 includes information within the message 3 (e.g., SI request message) which indicates that the gNB 404 should provide to UE 402 all system information used in a predetermined area, covering one or multiple cells.

In various embodiments, the gNB 404 may include the requested SIB(s)/SI(s) in a RACH message 4 (e.g., RRC message). In various embodiments, the SIB(s)/SI(s) requested by the UE 402 may be broadcast (instead of sending them in message 4). In such embodiments, the RACH message 4 may include the scheduling information which indicates the timing information for the broadcast of the requested SIB(s)/SI(s). Furthermore, in such embodiments, the UE 402 may not read minimum system information in order to acquire the timing information before receiving the broadcasted SIB(s)/SI(s).

In various embodiments, SIB(s)/SI(s) requested by the UE 402 may be partly provided by broadcast and partly within RACH message 4. In one embodiment, the RACH message 4 may include information indicating which SI(s)/SIB(s) are provided by RACH message 4 and which SI(s)/SIB(s) are broadcast (e.g., the UE 402 monitors during the SI window associated with these SI(s)/SIB(s) for receiving the broadcast channel). In some embodiments, the RACH message 4 may indicate scheduling information for SI(s)/SIB(s). In such embodiments, the UE 402 may use the scheduling information provided by message 4. In embodiments in which message 4 does not include scheduling information, the UE 402 may use scheduling information provided in the minimum SI to receive the SI(s)/SIB(s).

In one embodiment, the gNB 404 may send multiple RACH message 4 (e.g., to be provided SI(s)/SIB(s) may not fit within only one downlink transmission). In certain embodiments, an indication is contained within the RACH message 4 (e.g., SI feedback response) indicating whether the UE 402 should continue monitoring for further downlink transmissions (e.g., further RACH message 4 transmissions, monitor the same RNTI) for reception of further SI(s)/SIB(s) or whether UE may stop monitoring for further downlink transmissions (e.g., further RACH message 4 transmissions). In one embodiment, this indication is a boolean flag. In certain embodiments, the boolean flag may be set to mean that the gNB 404 may provide further SI(s)/SIB(s) directly in further downlink transmissions, and the boolean flag may be unset to mean that the gNB 404 may not provide further message 4 messages and thus the UE 402 may stop monitoring PDCCH for a corresponding RNTI. In various embodiments, the RACH message 4 may include information indicating whether the UE 402, in response to receiving the RACH message, should initiate an RRC connection establishment procedure or an RRC connection resume procedure.

In some embodiments, the radio network temporary identifier ("RNTI") used for RACH message 4 transmission may indicate the on-demand SIB(s) which are either included in message 4 (e.g., RRC message) or being broadcast. In such embodiments, a certain number of RNTI(s) (e.g., from the cell RNTI ("C-RNTI") space) may be reserved and associated to a specific SIB or a combination of several SIB(s).

In certain embodiments described herein, the RACH procedure may be used for the sole purpose of requesting on-demand SI. However, in some embodiments, the UE 402 may establish an RRC connection and at the same request on-demand SI, or the UE 402 in an inactive state may transmit UL data and at the same time trigger an on-demand SI acquisition procedure. In such embodiments, which are just examples, the UE 402 may send the SI-request MAC CE and the RRC connection request message in RACH message 3, or SI-request MAC CE and UL data and potentially some buffer status report ("BSR") MAC CE in RACH message 3. In such embodiments, the gNB 404 may distinguish between the different cases (e.g., SI-request, SI-Request plus initial access, SI-request plus UL data) so that the gNB 404 may dimension the size of the UL grant accordingly. Accordingly, in some embodiments, PRACH preambles may be reserved for identification of the different cases.

Figure 5:
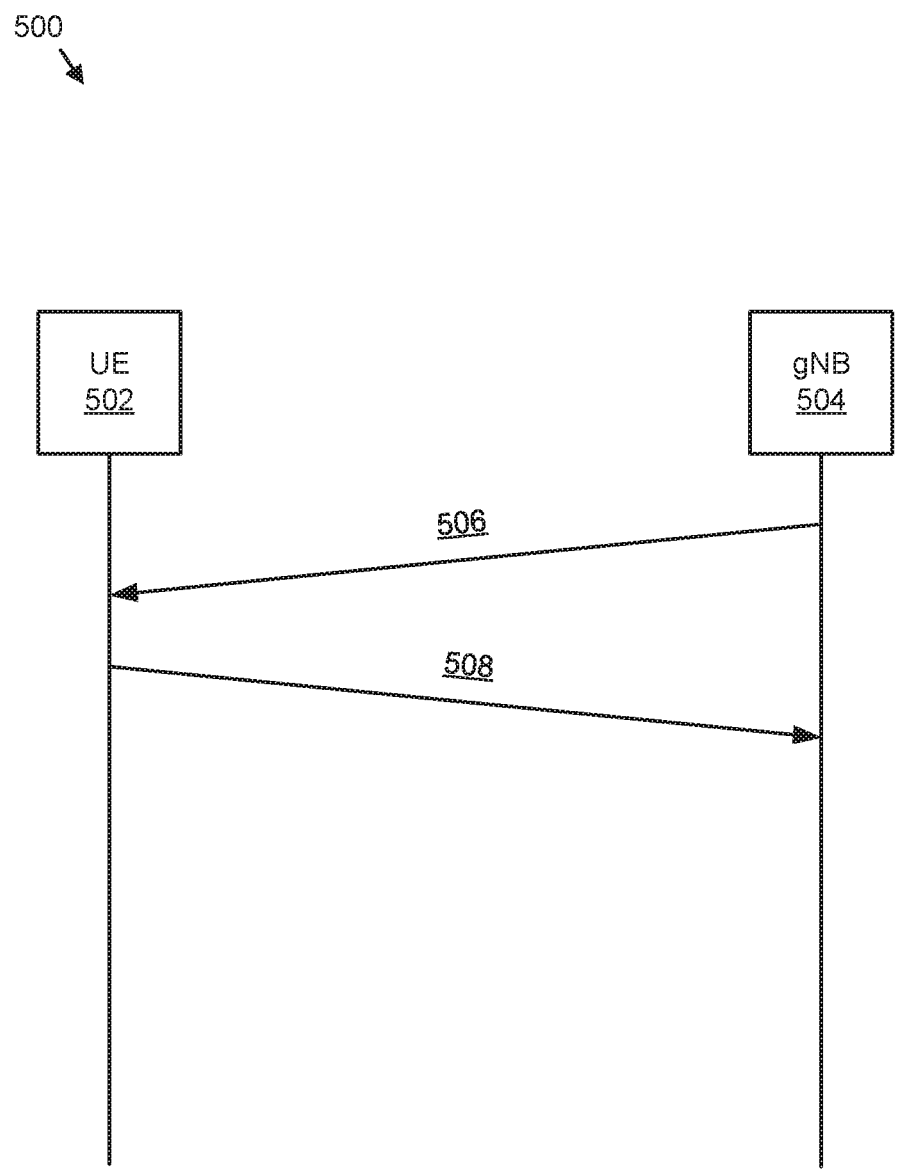
FIG. 5 illustrates another embodiment of communications for transmitting a request for system information.

FIG. 5 illustrates another embodiment of communications 500 for transmitting a request for system information. Specifically, communications 500 between a UE 502 and a gNB 504 are illustrated. The communications 500 may facilitate the UE 502 requesting on-demand SIBs using a RACH message 1 based approach.

In certain embodiments, the gNB 504 may transmit a periodic broadcast 506 to the UE 502. The periodic broadcast 506 may include minimum SI used by the UE 502 for communication. In various embodiments, the UE 502 may transmit a PRACH preamble 508 to the gNB 504. The PRACH preamble 508 indicates an SI request to the gNB 504 that indicates on-demand SIBs requested by the UE 502. The PRACH preamble 508 may be a message 1. As may be appreciated, the on-demand SIBs may not be broadcast (e.g., transmitted) unless requested.

In certain embodiments, the PRACH preamble 508 is resource specific to an SIB or set of SIBs which the UE 502 wants to obtain. In some embodiments, the PRACH preamble 508 that is resource specific to each SIB or set of SIBs are reserved and indicated in periodically broadcasted minimum SI. In certain embodiments, the UE 502 may request system information not only for the current cell, (e.g., cell UE is camped on/connected with) but also for neighboring cells. In one embodiment, a PRACH preamble 508 indicates that the gNB 504 should provide to UE 502 all system information used in a predetermined area, covering one or multiple cells.

In various embodiments, the UE 502 may receive a request to perform the random access procedure for a different purpose than for on-demand SI acquisition (e.g., initial access) while also being triggered to perform the SI acquisition. In such embodiments, the UE 502 may deprioritize the RACH procedure for SI request. For example, the UE 502 may first perform the initial access and then retrieve the system information by dedicated signaling (e.g., RRC signaling).

Figure 6:
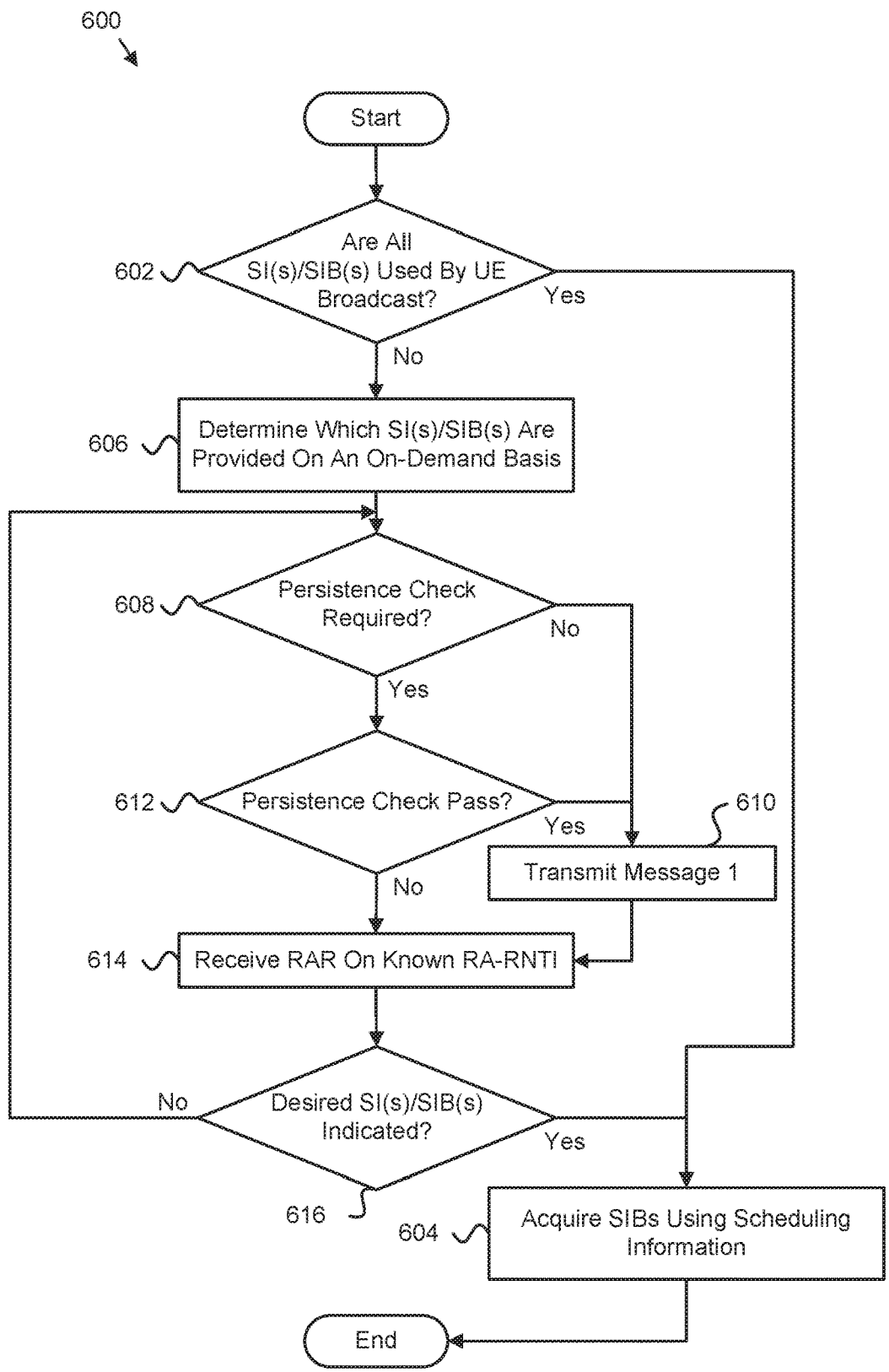
FIG. 6 is a schematic flow chart diagram illustrating one embodiment of a method for determining a request for system information.

FIG. 6 is a schematic flow chart diagram illustrating one embodiment of a method 600 for determining a request for system information. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In certain embodiments, UEs may monitor the same random access RNTI ("RA-RNTI") to receive a random access response (RAR or Msg2) to check if its (a particular UE's) sent preamble was received by the network and therefore in RAR it may confirm if the corresponding SI(s)/SIB(s) would be subsequently transmitted by the network on an on-demand basis. In such embodiments, an RA-RNTI (or a group of such pre-known RNTIs) may be known to the UEs because of one of the following: the RA-RNTI (or a group of such pre-known RNTIs) is specified; the RA-RNTI (or a group of such pre-known RNTIs) is configured as part of SI (e.g., minimum SI may be available by broadcast from the network); and/or the RA-RNTI (or a group of such pre-known RNTIs) is calculated from a known set of parameters like time and frequency resources of the PRACH resource(s) used by the UE(s) to transmit their preamble (e.g., message 1).

In some embodiments, one RA-RNTI may be sufficient to cater to all UEs requesting SI within a certain window; however, to cater to more than one overlapping window and/or for generalization, more than one RA-RNTI may be used.

In another embodiment, UEs that sent a message 3 (e.g., Msg3) may monitor the same C-RNTI (or a group of such pre-known C-RNTIs) to receive a message 4 (e.g., Msg4) and further check if its (a particular UE's) Msg3 for requesting particular SI(s)/SIB(s) is received by the network and the request is accepted by the network. In some embodiments, a UE receives and analyzes Msg4 to check if the corresponding SI(s)/SIB(s) will be transmitted by the network on an on-demand basis. In certain embodiments, one C-RNTI (or a group of such pre-known C-RNTIs) may be known to the UEs because of one of the following: the C-RNTI (or a group of such pre-known RNTIs) is specified; the C-RNTI (or a group of such pre-known RNTIs) is configured as part of SI (e.g. a minimum SI may be available by broadcast from the network); the C-RNTI (or a group of such pre-known RNTIs) is calculated from a known set of parameters like time and frequency resources of the PRACH resource(s) used by the UE(s) to transmit their preamble (e.g., Msg1); and/or the C-RNTI (or a group of such pre-known RNTIs) is provided as part of RAR and the RAR is received using a RA-RNTI pre-known to the UE.

In various embodiments, only one C-RNTI may be sufficient to cater to all UEs requesting SI within a certain window; however, for generalization, more than one such C-RNTIs may be used.

In some embodiments, transmission of Msg1 (e.g., PRACH preamble) in a Msg1 based method may be unnecessary to obtain particular SI(s)/SIB(s). In various embodiments, transmission of Msg1 (e.g., PRACH preamble), reception of Msg2, and transmission of Msg3 in Msg3 based method may be unnecessary to obtain particular SI(s)/SIB(s).

Turning to the method 600, the method 600 may include determining 602 whether all SIBs to be used by a remote unit 102 are broadcast by a base unit 104. In response to all SIBs to be used by the remote unit 102 being broadcast, the method 600 acquires 604 SIBs using scheduling information that may be obtained from minimum SI, and the method 600 may end. In response to all SIBs to be used by the remote unit 102 not being broadcast, the method 600 determines 606 which SIBs are provided by the base unit 104 on an on-demand basis.

The method 600 then determines 608 whether a persistence check is required. The persistence check may be performed, in various embodiments, to avoid a situation in which there are too few remote units transmitting and too many remote units just listening to responses to on-demand requests made by other UEs. In one embodiment, the persistence check may be required to be performed as indicated by a base unit 104. In response to the persistence check not being required, the method 600 may transmit 610 message 1 to request SI(s)/SIB(s) that are available on-demand. Transmitting 610 the message 1 as described herein may include choosing a preamble to transmit.

In certain embodiments, a network (e.g., base unit 104) may configure multiple different preambles (e.g., Preamble 1 that indicates SIBs A and B, Preamble 2 that indicates SIBs C and D, Preamble 3 that indicates SIBs E and F, Preamble 4 that indicates SIBs G and H, and so forth). In one example, a remote unit 102 may choose a preamble to transmit by determining that it needs SIBs A, B, and H and then selecting a preamble that corresponds to at least a portion of the needed SIBs (e.g., Preamble 1). After transmitting Preamble 1 to indicate SIBs A and B, the remote unit 102 may then check to see if SIBs A, B, and H are indicated to be provided. In response to none of A, B, and H being indicated to be provided, the remote unit 102 may again transmit Preamble 1 and check for an indication. In response to an indication that A and B are indicated as being provided, but not H, the remote unit 102 may proceed to acquire A and B and initiate Preamble 4 transmission in a similar manner as described above relating to Preamble 1. In response to only H being indicated as being provided, the remote unit 102 may proceed to acquire H and again transmit Preamble 1. In response to A, B, and H being indicated as being provided, the remote unit 102 may proceed to acquire A, B, and H.

In response to the persistence check being required, the method 600 performs the persistence check. The persistence check may be performed in one embodiment by comparing a UE generated decimal value between 0.0 and 1.0 (designated herein as 'r') against another decimal value (designated herein as 'p'). 'p' may be specified or configured using a broadcast message (e.g., like minimum SI). The method 600 may determine 612 whether the persistence check passes. In one embodiment, the persistence check may pass if 'r' is smaller than or equal to 'p'. In another embodiment, the persistence check may pass if 'r' is greater than or equal to 'p'. In response to the persistence check passing, the remote unit 102 may transmit 610 message 1 to request SI(s)/SIB(s) that are available on-demand. By using the persistence check, the base unit 104 may control how many remote units initiate a RACH procedure. In certain embodiments, a specific value of 'p' could have a special meaning (e.g., 'p'=0 could mean an automatic persistence check pass i.e., all remote units send message 1, 'p'=1 could mean an automatic persistence check fail i.e., no remote units send message 1. For example, special values of 'p' may be used, due to congestion, to indicate that the network is already transmitting the required SI using broadcast, or in a time frame known to the remote unit 102, or vice-versa.

In response to the persistence check not passing, the method 600 receives 614 RAR on a known RA-RNTI. The method 600 checks the RAR to determine 616 whether desired SI(s)/SIB(s) is indicated. As used herein, "desired SI(s)/SIB(s)" may mean the SIB(s)/SI(s) corresponding to transmitting 610 the message 1 (e.g., preamble) and/or preambles that may have been transmitted to receive other SIB(s)/SI(s).

In response to determining that the desired SI(s)/SIB(s) is not indicated, the method 600 returns to determining 608 whether a persistence check is required. In response to determining that the desired SI(s)/SIB(s) is indicated, the method 600 acquires 604 SIBs using scheduling information.

In certain embodiments, such as in a message 1 based solution, the following preambles may be used to make on-demand requests: Preamble 0 may indicate all SI A to H; Preamble 1 may indicate SI A and B; Preamble 2 may indicate SI C and D; Preamble 3 may indicate SI E and F; and Preamble 4 may indicate SI G and H.

In some embodiments, using a message 1 based method 600 some preamble transmissions from a remote unit 102 may not be necessary thereby saving the remote unit 102 power, reducing UL resources, reducing UL traffic, reducing UL collision, and so forth. This is facilitated because all remote units receive the RAR response (e.g., Msg2) using a particular (specified or configured) RA-RNTI and may check as part of RAR content (or alternatively DCI) if the particular remote unit's requested SI(s)/SIB(s) are listed therein. In certain embodiments, in RAR the base unit 104 may provide a list of SIs and SIBs (e.g., using a bitmap in which every bit or bitmap corresponds to a particular SI(s)/SIB(s), and this mapping is known to both the remote unit 102 and the base unit 104, setting a bit may mean that the corresponding system information will be provided, an unset bit means the corresponding system information will not be provided, or vice-versa) that it intends to provide on an on-demand basis (e.g., broadcast for certain duration known to the remote units from minimum SI). Accordingly, a particular remote unit 102 does not need to actually transmit a corresponding preamble (e.g., Preamble 2) to request SIs (e.g., C and D) as long as it can verify that SIs C and D are listed in RAR.

In certain embodiments, a base unit 104 includes just one MAC PDU containing just one MAC RAR including a bitmap of SIs and/or SIBs that it is going to provide on demand (based on all requests it received within a window). In such embodiments, only one RA_RNTI may be used.

In various embodiments, to be able to receive/check RAR, a remote unit 102 need not have transmitted the message 1 itself. In such embodiments, the remote unit 102 may listen for Msg2/RAR which the base unit 104 may have sent in response to Msg1 sent by other remote units. As set forth above, a persistence check may be used so that remote units that are not transmitting Msg1 but just listening for Msg2 do not just listen endlessly. The persistence check helps to avoid unnecessarily listening when no response (RAR) would actually come, or only responses (RARs) not containing its required SI(s)/SIB(s) in the list are received. In some embodiments, the amount of time that the remote unit 102 may perform just listening may be limited. In various embodiments, this limited time (e.g., duration, start time, end time, etc.) may be either remote unit implementation specific, specified, or configured (e.g., using a broadcast message like minimum SI).

In certain embodiments, a message 3 based solution may be similar to the message 1 based solution of method 600, except that the C-RNTI used to scramble the cyclic redundancy code ("CRC") of PDCCH scheduling Msg4 may be known to all UEs (e.g., the C-RNTI(s) may be specified or configured using a broadcast message like minimum SI). In various embodiments, remote units that are just listening, receive only Msg4 on the C-RNTI and check the contents of Msg4 (or alternatively DCI) to determine if the particular remote unit's requested SI(s)/SIB(s) are listed therein. In Msg4, the base unit 104 may provide a list of SIs and SIBs (e.g., using a bitmap in which every bit or bitmap corresponds to a particular SI(s)/SIB(s), and this mapping is known to both the remote unit 102 and the base unit 104, setting a bit may mean that the corresponding system information will be provided, an unset bit means the corresponding system information will not be provided, or vice-versa) that it intends to provide on an on-demand basis (e.g., broadcast for a certain duration known to the remote units from minimum SI). Accordingly, in such embodiments, it is not important that a remote unit 102 actually transmitted the Msg1 and Msg3 to request SIs as long as it can see that SIs that the remote unit 102 is interested in are listed in RAR. Certain embodiments of a message 3 based solution may include limiting a time that the remote unit 102 is just listening for Msg4 without transmitting and/or persistence checks as described herein.

In some embodiments, if a remote unit 102 determines that it will send multiple different preambles for different SI(s)/SIB(s) requests, the remote unit 102 may determine an order for sending the different preambles. In various embodiments, the remote unit may: send an SI-request for an SI in which the SI-window is the closest in time; prioritize transmission of a preamble which corresponds to an essential SIB (e.g., request corresponding SI first); prioritize transmission of a preamble which corresponds to SIB(s) which are required for a particular feature (e.g., like evolved multimedia broadcast multicast services ("eMBMS") reception in idle mode) activation; or some combination thereof.

Figure 7:
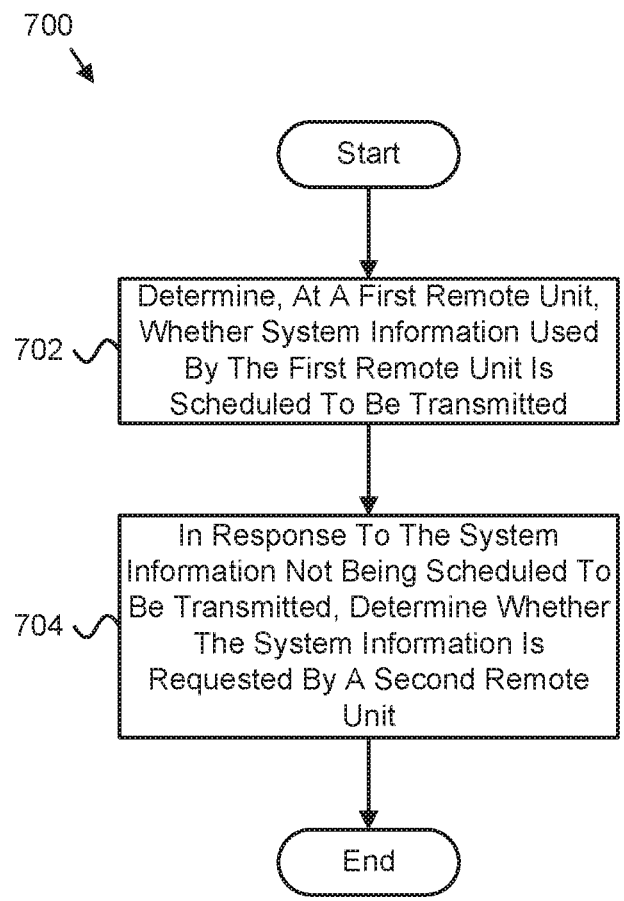
FIG. 7 is a schematic flow chart diagram illustrating another embodiment of a method for determining a request for system information.

FIG. 7 is a schematic flow chart diagram illustrating another embodiment of a method 700 for determining a request for system information. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702, at a first remote unit (e.g., remote unit 102), whether system information used by the first remote unit is scheduled to be transmitted. The method 700 also includes, in response to the system information not being scheduled to be transmitted, determining 704 whether the system information is requested by a second remote unit (e.g., remote unit 102).

In one embodiment, the method 700 includes, in response to the system information being scheduled to be transmitted, receiving the system information based on scheduling information for the system information. In a further embodiment, determining whether the system information is requested by the second remote unit includes monitoring messages for an indication that the system information is requested by the second remote unit. In certain embodiments, determining whether the system information is requested by the second remote unit includes checking a common radio network temporary identifier for an indication that the system information is requested by the second remote unit. In various embodiments, the method 700 includes, in response to the system information being requested by the second remote unit, receiving the system information in response to the system information being transmitted to the second remote unit. In some embodiments, the method 700 includes, in response to the system information not being requested by the second remote unit, transmitting a request for the system information.

In certain embodiments, transmitting a request for the system information includes determining whether the first remote unit is authorized to transmit the request prior to transmitting the request. In some embodiments, determining whether the first remote unit is authorized to transmit the request includes checking a parameter. In various embodiments, the method 700 includes, in response to the parameter passing a predetermined threshold, transmitting the request for system information, and, in response to the parameter not passing the predetermined threshold, not transmitting the request for system information.

In one embodiment, the method 700 includes receiving a response to the request for the system information. In certain embodiments, the response to the request for the system information is received as part of a random access response having a random access radio network temporary identifier. In some embodiments, the response to the request for the system information includes an indication identifying the system information. In various embodiments, transmitting the request for system information includes determining an order of requests in response to the request including multiple preambles. In certain embodiments, the order of requests includes transmitting a preamble of the multiple preambles first that corresponds to system information scheduled to be transmitted a closest in time, system information more important than other preambles of the multiple preambles, system information for a particular feature, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor that:
      determines whether system information used by the apparatus is scheduled to be transmitted; and
      in response to the system information not being scheduled to be transmitted, determines whether the system information is requested by a second apparatus by checking a list received in a random access response, wherein the list indicates system information requested by the second apparatus that is to be transmitted, the apparatus is a first user equipment, and the second apparatus is a second user equipment.

2. The apparatus of claim 1, further comprising a receiver that, in response to the system information being scheduled to be transmitted, receives the system information based on scheduling information for the system information.

3. The apparatus of claim 1, wherein determining whether the system information is requested by the second apparatus comprises monitoring messages for an indication that the system information is requested by the second apparatus.

4. The apparatus of claim 1, wherein determining whether the system information is requested by the second apparatus comprises checking a common radio network temporary identifier for an indication that the system information is requested by the second apparatus.

5. The apparatus of claim 1, further comprising a receiver that, in response to the system information being requested by the second apparatus, receives the system information in response to the system information being transmitted to the second apparatus.

6. The apparatus of claim 1, further comprising a transmitter that, in response to the system information not being requested by the second apparatus, transmits a request for the system information.

7. The apparatus of claim 6, wherein transmitting a request for the system information comprises the processor determining whether the apparatus is authorized to transmit the request prior to transmitting the request.

8. The apparatus of claim 7, wherein determining whether the apparatus is authorized to transmit the request comprises checking a parameter.

9. The apparatus of claim 8, further comprising, in response to the parameter passing a predetermined threshold, transmitting the request for system information, and, in response to the parameter not passing the predetermined threshold, not transmitting the request for system information.

10. The apparatus of claim 6, further comprising a receiver that receives a response to the request for the system information.

11. The apparatus of claim 10, wherein the response to the request for the system information is received as part of a random access response having a random access radio network temporary identifier.

12. The apparatus of claim 10, wherein the response to the request for the system information comprises an indication identifying the system information.

13. The apparatus of claim 6, wherein transmitting the request for system information comprises the processor determining an order of requests in response to the request comprising a plurality of preambles.

14. The apparatus of claim 13, wherein the order of requests comprises transmitting a preamble of the plurality of preambles first that corresponds to system information scheduled to be transmitted a closest in time, system information more important than other preambles of the plurality of preambles, system information for a particular feature, or some combination thereof.

15. A method comprising:
    determining, at a first remote unit, whether system information used by the first remote unit is scheduled to be transmitted; and
    in response to the system information not being scheduled to be transmitted, determining, at the first remote unit, whether the system information is requested by a second remote unit by checking a list received in a random access response, wherein the list indicates system information requested by the second remote unit that is to be transmitted, the first remote unit is a first user equipment, and the second remote unit is a second user equipment.

16. The method of claim 15, further comprising, in response to the system information being scheduled to be transmitted, receiving the system information based on scheduling information for the system information.

17. The method of claim 15, wherein determining whether the system information is requested by the second remote unit comprises monitoring messages for an indication that the system information is requested by the second remote unit.

18. The method of claim 15, wherein determining whether the system information is requested by the second remote unit comprises checking a common radio network temporary identifier for an indication that the system information is requested by the second remote unit.

19. The method of claim 15, further comprising, in response to the system information being requested by the second remote unit, receiving the system information in response to the system information being transmitted to the second remote unit.

20. The method of claim 15, further comprising, in response to the system information not being requested by the second remote unit, transmitting a request for the system information.

21. The method of claim 20, wherein transmitting a request for the system information comprises determining whether the first remote unit is authorized to transmit the request prior to transmitting the request.

22. The method of claim 21, wherein determining whether the first remote unit is authorized to transmit the request comprises checking a parameter.

23. The method of claim 22, further comprising, in response to the parameter passing a predetermined threshold, transmitting the request for system information, and, in response to the parameter not passing the predetermined threshold, not transmitting the request for system information.

24. The method of claim 20, further comprising receiving a response to the request for the system information.

25. The method of claim 24, wherein the response to the request for the system information is received as part of a random access response having a random access radio network temporary identifier.

26. The method of claim 24, wherein the response to the request for the system information comprises an indication identifying the system information.

27. The method of claim 20, wherein transmitting the request for system information comprises determining an order of requests in response to the request comprising a plurality of preambles.

28. The method of claim 27, wherein the order of requests comprises transmitting a preamble of the plurality of preambles first that corresponds to system information scheduled to be transmitted a closest in time, system information more important than other preambles of the plurality of preambles, system information for a particular feature, or some combination thereof.

* * * * *